United States Patent [19]

Inariba

[11] 4,009,406
[45] Feb. 22, 1977

[54] SYNCHRONOUS MICROMOTOR WITH A PERMANENT MAGNET ROTOR

[76] Inventor: Tokuzo Inariba, c/o Room No. 906, Kamiuma Mansion, No. 2-9, Kamiuma 4-chome, Setagaya, Tokyo, Japan

[22] Filed: Nov. 25, 1975

[21] Appl. No.: 635,232

[52] U.S. Cl. .................... 310/164; 310/40 MM; 310/156; 310/112; 310/114; 310/257
[51] Int. Cl.² .................................. H02K 21/14
[58] Field of Search ............ 310/40 MM, 41, 156, 310/162–164, 49, 257, 112, 114, 126

[56] References Cited

UNITED STATES PATENTS

| 2,122,307 | 6/1938 | Welch | 310/164 |
|---|---|---|---|
| 2,548,633 | 4/1951 | Stephenson | 310/164 |
| 3,135,886 | 6/1964 | Kavanaugh | 310/126 X |
| 3,501,658 | 3/1970 | Morley | 310/112 X |
| 3,504,253 | 3/1970 | Kavanaugh | 310/257 X |
| 3,541,363 | 11/1970 | Vettermann et al. | 310/257 X |
| 3,549,918 | 12/1970 | Croymans et al. | 310/49 |
| 3,571,638 | 3/1971 | Inariba | 310/164 X |
| 3,668,585 | 6/1972 | Johnson | 310/257 UX |
| 3,684,907 | 8/1972 | Hinachi et al. | 310/164 X |
| 3,693,034 | 9/1972 | Inariba | 310/112 X |
| 3,894,252 | 7/1975 | Miwa et al. | 310/114 X |
| 3,950,663 | 4/1976 | Mead | 310/112 X |
| R28,075 | 7/1974 | Kavanaugh | 310/162 X |

Primary Examiner—Donovan F. Duggan
Attorney, Agent, or Firm—Steinberg & Blake

[57] ABSTRACT

A synchronous micrometer wherein the rotor has a permanent magnet structure. This permanent magnet structure is surrounded by a cylindrical stator component of soft magnetic material formed with elongated axially extending cutouts which except for their opposed ends are of substantially elliptical configuration to define between themselves elongated axially extending wall portions of the cylindrical stator component which are of a substantially hourglass configuration. To one end of this cylindrical stator component is fixed a transverse wall which engages a transverse wall of a casing which houses a coil structure which coaxially surrounds the cylindrical stator component as well as the permanent magnet rotor.

12 Claims, 11 Drawing Figures

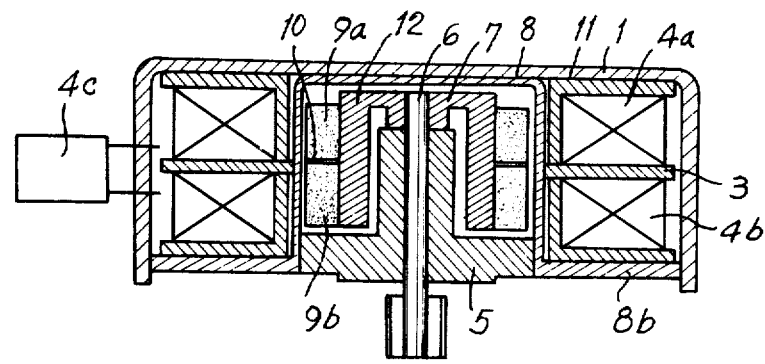
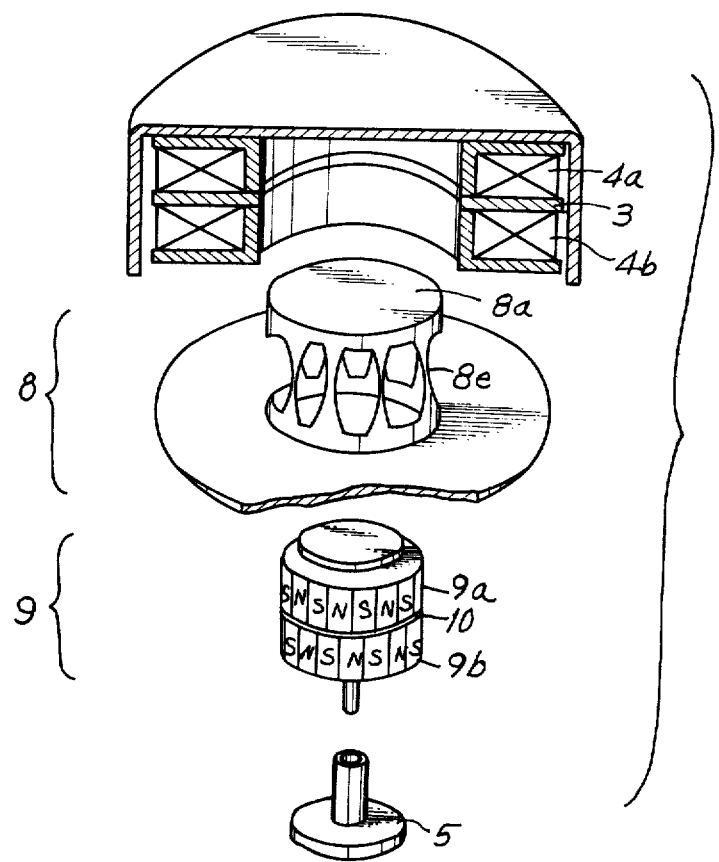

SYNCHRONOUS MICROMOTOR WITH A PERMANENT MAGNET ROTOR

BACKGROUND OF THE INVENTION

The present invention relates to synchronous micromotors. The invention relates in particular to a self-starting synchronous micromotor comprising two-stage coils, permanent magnets serving as a rotor, a circular cylindrical stator with elongated portions which have such a configuration as to make the magnetic flux of the AC magnetic field developed by said coils effectively intersect the magnetic flux existing on the cylindrical circumferential surfaces of said permanent magnets, a closed AC magnetic circuit with minimum magnetic loss and no gap formed in the AC magnetic circuit and a third magnetic circuit.

Many types of induction synchronous motors have been proposed heretofore. While motors of this type have a self-starting capability, they are free to start rotation in either direction. It is thus essential with such motors to provide some mechanical control to assure rotation in the desired direction. Such mechanical structure often results in failure of starting of the motor and increases the possibility of faulty operation of the motor due to wear and other problems encountered with such mechanical structure.

In addition, with previously known induction motors it is essential to use a rotor which has a relatively large moment of inertia as well as a relatively large weight in order to achieve smooth rotation. This relatively large moment of inertia and weight of conventional motors of the above type reduces considerably the self-starting capability of the conventional motors. Thus, it is known that a micromotor having a rotor of relatively large weight and increased moment of inertia is largely influenced by the starting power and operation power so as to achieve only a low operation efficiency while generating undesirable heat.

Furthermore, with conventional motors of the above type N and S poles are developed between the stator and rotor. As a result permanent magnets cannot be used effectively.

SUMMARY OF THE INVENTION

It is accordingly a primary object of the present invention to provide a motor of the above general type which will avoid the above drawbacks.

Thus, it is an object of the present invention to provide a light-weight synchronous micromotor which has a self-starting capability and which, when energized, will reliably rotate in predetermined direction without requiring the use of any mechanical structure to assure rotation in the desired direction.

Also it is an object of the present invention to provide a motor of the above type; which has a rotor of relatively light weight without any particularly large moment of inertia while at the same time achieving a smooth rotation.

Furthermore, it is an object of the present invention to provide a motor of the above type which can provide the desired rotary movement while utilizing relatively small magnetic forces.

In addition it is an object of the present invention to provide a motor of the above general type which will have a relatively high efficiency without generating undesirable heat.

Also, it is an object of the present invention to provide a micromotor of the above general type which can make a very effective use of permanent magnets.

According to the invention a self-starting synchronous motor is provided with a rotor which includes a pair of circular cylindrical permanent magnet means which respectively have equal diameters and which coaxially surround a common axis, these permanent magnet means having an equal number of N and S poles circumferentially distributed alternately around the above axis with the poles of one of the permanent magnet means having a predetermined angular offset relationship with respect to the poles of the other of the permanent magnet means so as to achieve in this way a predetermined out-of-phase relationship between the poles of the pair of permanent magnet means. The pair of permanent magnet means are respectively surrounded by a pair of coil means which are situated adjacent each other on opposite sides of a plane normal to the above axis with the pair of permanent magnet means also being situated adjacent each other on opposite sides of the latter plane, and the pair of coil means have a diameter larger than that of the permanent magnet means and respectively receive alternating currents which have with respect to each other the same out-of-phase relationship as the poles of the pair of permanent magnet means. The pair of coil means are separated from each other by an annular soft magnetic plate which is situated in the above plane. An elongated stator portion disposed in opposition to the rotor which is supported for rotation around the above axis includes a cylindrical wall coaxially surrounding this axis and extending between the pair of permanent magnet means, on the one hand, and a pair of coil means with the plate therebetween on the other hand. This cylindrical wall of the stator is formed with a plurality of axially extending cutouts circumferentially distributed around the above axis and separated from each other by elongated portions of the cylindrical wall which also are uniformly distributed circumferentially around the above axis. It is preferred that each of the rotor permanent magnets has magnetic poles of which number is twice as much as the number of the elongated stator portions. The circular cylindrical stator and the rotor permanent magnets are arranged in such relative positions that, when the exciting coils are not energized, each elongated stator portion is in line with and midway between the center line passing through a pole included in the first row of magnetic poles and the center line passing through the adjacent opposite pole included in the second row of magnetic poles. The stator has one end of its circular cylindrical wall formed into a cup-shape which can be brought into close contact with the casing at a sufficient area. The circular cylindrical wall of the stator has an opposite end from which a flange-like annular base plate is extended outwardly. The annular base plate also serves as the yoke and constitutes a portion of the casing. Accordingly, the AC magnetic circuit established upon excitation of coils is a closed magnetic circuit including no gap. A third magnetic pole is interposed between the pair of coils so as to establish a third magnetic circuit. The third magnetic pole is made of an annular soft magnetic plate, of which outer circumference is in contact with or close to the inner wall surface of the yoke which also serves as the casing, while the inner circumference of the annular soft magnetic plate is in close contact with the central narrow portions of the elongated cylindrical wall portions.

Thus, with the motor of the invention there is a two-stage coil and a pair of permanent magnets which serve as a rotor, while a cylindrical stator of circular cross section is provided with elongated axially extending portions the configuration of which is selected so as to make the magnetic flux of an AC magnetic field developed by the coils effectively intersect the magnetic flux existing at the cylindrical circumferential surfaces of the permanent magnets, while at the same time the losses of the AC magnetic flux are minimized. The cylindrical stator also has a bottom portion disposed in close contact with the fixed yoke portion so as to minimize the magnetic resistance.

BRIEF DESCRIPTION OF DRAWINGS

FIG. 3 is a partly schematic sectional elevation of another embodiment of the invention also taken in a plane which contains the rotor axis;

FIG. 4 is a partly sectional and partly fragmentary perspective exploded view of the embodiment of FIG. 3;

FIG. 8A is a wiring diagram illustrating a pair of coils connected in parallel; and FIG. 8B is a wiring diagram illustrating a pair of coils connected in series.

DESCRIPTION OF PREFERRED EMBODIMENTS

Figure 1:
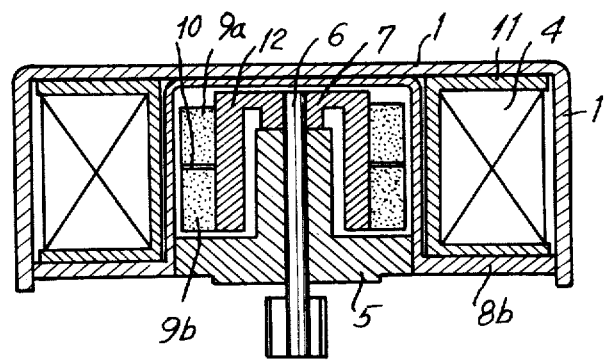
FIG. 1 is a sectional elevation of one embodiment of the invention taken in a plane which contains the axis of the rotor.
Figure 2:
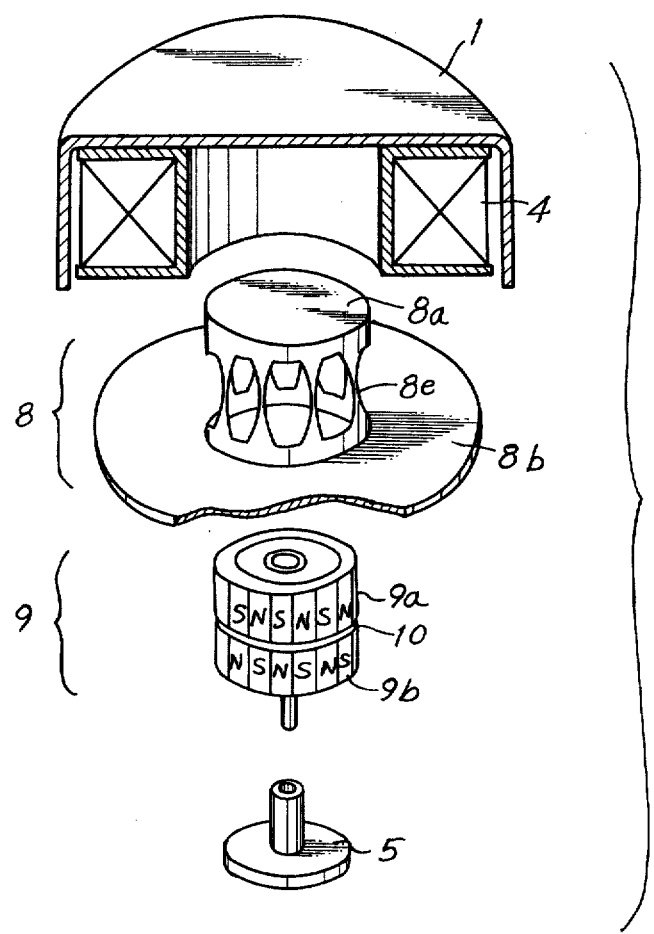
FIG. 2 is a partly sectional and partly fragmentary exploded perspective illustration of the embodiment of FIG. 1.

Referring to FIGS. 1 and 2, the embodiment of a synchronous micromotor of the invention which is illustrated therein includes a motor casing means 1 and a base plate 8b. The parts 1 and 8b are made of a soft magnetic material and serve both as a casing and a yoke. The part 1 has a cylindrical outer side wall and a flat end wall as shown at the upper part of FIGS. 1 and 2, while the part 8b is in the form of an annular plate fixed at its outer peripheral edge to the inner surface of the cylindrical side wall of the casing part 1. Unlike the embodiment of FIGS. 3 and 4, in the embodiment of FIGS. 1 and 2 the coil is not made into a two-stage construction and no third magnetic pole is provided. Although the permanent magnet rotor is made into a two-stage construction, unlike the embodiment of FIGS. 1–3, all the poles of the lower magnet are disposed directly below the poles of opposite polarity included in the upper magnet.

In the embodiment of FIGS. 3 and 4, an annular soft magnetic plate 3 is situated substantially midway between the base plate 8b and the flat end wall of the casing 1, being parallel to the plate 8b and the flat end wall of the casing part 1, and this soft magnetic plate 3 may be considered as forming a third magnetic pole.

The plate 3 is of an annular configuration and is situated between a pair of annular coil means 4a and 4b which together constitute a double-stage coil (in the shown embodiment), arranged so as to form an upper stage and a lower stage), the circular coil means 4a and 4b as well as the magnetic plate situated between and separating the pair of coil means all being arranged coaxially around a common axis which coincides with the axis of the shaft 6. As is shown schematically at the left of FIG. 3, the pair of coil means 4a and 4b are electrically connected with a unit 4c forming an AC supply capable of being connected with any suitable source of alternating current and acting in a known way to provide the pair of coils 4a and 4b with alternating currents of equal frequency but having a predetermined out-of-phase relationship with respect to each other. FIGS. 8A and 8B show an example of connection of an AC supply designated as 4C in FIG. 3. 4a and 4b in these Figures correspond to the coils 4a and 4b in FIG. 3, C is a capacitor and S is a switch for changing the rotation. Parallel connection of FIG. 8A is for 100V and series connection of FIG. 8B is for 200V.

Figure 5A:
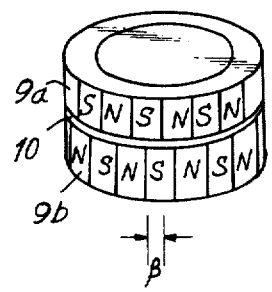
FIGS. 5A and 5B respectively illustrate schematically in a perspective view two different embodiments of a permanent magnet means for the rotor.
Figure 5B:
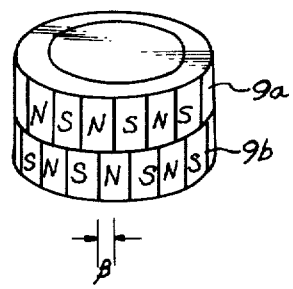

The shaft 6 forms part of a support means operatively connected with a permanent magnet rotor 9 to support the latter for free rotary movement. For this purpose the shaft 6 is supported for free rotary movement in a bearing 5 which is made of a non-magnetic material and which is centrally fixed to the base plate 8b. The shaft 6 also serves to support through the non-magnetic ring 12 a pair of annular permanent magnet means 9a and 9b made of barium ferrite. The pair of permanent magnet means 9a and 9b each includes a series of N and S poles circumferentially distributed about the axis of the shaft 6. Thus, as is most clearly shown in FIGS. 5A and 5B the series of N and S poles of each of the permanent magnet means 9a and 9b alternate with each other while the poles of one of the permanent magnet means are angularly offset with respect to the poles of the other of the permanent magnet means by the angular distance $\beta$, as indicated in FIGS. 5A and 5B. This angular offset provides a predetermined out-of-phase relationship between the poles of the pair of permanent magnet means 9a and 9b, and as will be apparent from the description below this out-of-phase relationship corresponds to the out-of-phase relationship between the alternating currents supplied to the pair of coil means 4a and 4b. As is apparent from FIGS. 5A and 5B each pole of each permanent magnet is situated along a line which is parallel to the axis of the shaft 6 and which is situated between a pair of successive poles of the other permanent magnet. In this way a predetermined phase angle $\beta$ is provided between the poles of the pair of permanent magnet means 9a and 9b. In the particular example shown in FIGS. 5A and 5B each of the permanent magnets 9a and 9b is provided with 8N poles which respectively alternate with 8S poles, all of these poles being uniformly distributed circumferentially around the common axis of the pair of permanent magnets. FIG. 5B illustrates an embodiment wherein the plate 10 of FIG. 5A is omitted and the permanent magnets are magnetized integrally.

The pair of permanent magnet means 9a and 9b are situated adjacent each other respectively on opposite sides of a plane normal to the common axis around which the pair of permanent magnet means extend, and this plane is occupied by a plate 10 made of a soft magnetic material, this plate 10 separating the pair of permanent magnet means from each other and preventing the pair of permanent magnet means from having an undesirable reaction with respect to the stator 8. Moreover, the plate 10 is situated in the same plane as the annular magnetic plate 3 with the pair of coil means 4a and 4b together with the supporting structure 11 on which the coils are wound circumferentially surrounding the pair of permanent magnets 9a and 9b coaxially while being spaced therefrom to define in this way between the inner surfaces of the coil support structures 11 and the outer surfaces of the pair of permanent magnet means 9a and 9b an axially extending cylindrical gap of substantially uniform width. It will be noted that the inner circumferential edge of the plate 3 which extends along a circle whose center is in the axis of the shaft 6 has a diameter only slightly smaller than that of the inner surfaces of the coil support structures 11. Thus, the series of magnetic poles of the pair of permanent magnet means 9a and 9b are arranged so that they are directed toward the inner circumferential surfaces of the coil support structures 11 and stator 8 and together with the plate 3 the required magnetic fields are developed as set forth below.

As is apparent particularly from FIG. 4, the stator 8 is of a cylindrical configuration and is circular in cross section having a cylindrical wall which coaxially surrounds the axis of the shaft 6 so that an elongated annular cylindrical gap of uniform thickness is defined between the cylindrical wall of the stator 8 and the pair of permanent magnet means 9a and 9b. All the elements, with the exception of the rotor 9, form part of the stator and are stationary. The stator 8 is formed in its cylindrical wall with a plurality of uniformly distributed elongated cutouts which except for their straight ends have a substantially elliptical configuration and which are uniformly distributed about the common axis of all of the annular components. These elongated axially extending cutouts are separated from each other by elongated stator portions 8e which are also uniformly distributed about the rotor axis and which are each of a substantially hourglass configuration. Thus each of the elongated portions 8e of the stator extends parallel to the axis of the shaft 6 and has in the plane occupied by the annular magnetic plates 3 and 10 a minimum width. At each side of this plane each elongated portion 8e becomes gradually wider in a direction away from the plane, as is apparent from FIGS. 3 and 4. Thus the widest parts of the elongated portions 8e merge into the annular opposed end portions of the stator. Accordingly, the central portion of each elongated portion 8e forms a narrow portion.

The upper end of the shaft 6, as viewed in FIGS. 3 and 4, is fixed to and surrounded by circular non-magnetic integral rings 7 and 12 made of a light alloy or a synthetic resin and extending into and fixed to a central opening which is formed in the pair of permanent magnets 9a and 9b of the rotor 9 and the plate 10. The circumferential surface of the rotor is coaxial with and spaced only slightly from the elongated portions 8e of the cylindrical stator so as to define a narrow gap therewith. Thus DC and AC magnetic circuits are established which intersects with each other at an extremely high efficiency. In the embodiment of FIG. 4 the stator 8 has opposite the cup-shaped end portion 8a an outwardly directed flat flange-like base plate 8b, which forms together with the casing 1 a yoke which serves also as the casing. The cup-shaped end portion 8a and base plate 8b of the stator are brought into close contact with the inner surface of the casing 1. The magnetic circuit formed with the base plate 8b extending parallel to the transverse wall of the casing 1 and the end portion 8a of the stator cylinder is a closed AC magnetic circuit having no gap.

Figure 7:
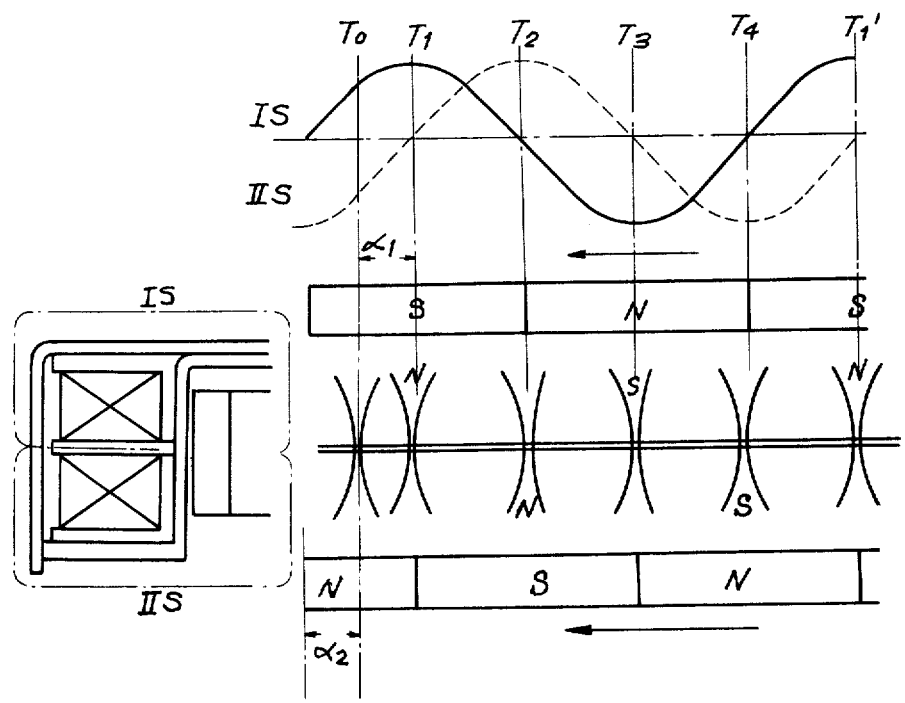
FIG. 7 is a diagrammatic representation of the manner in which the synchronous motor of the invention develops torque.
Figure 11A:
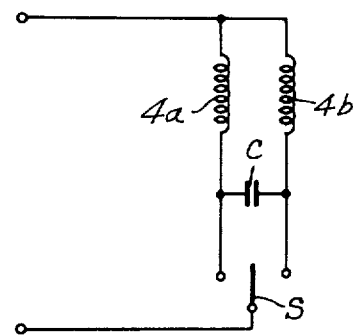
Figure 11B:
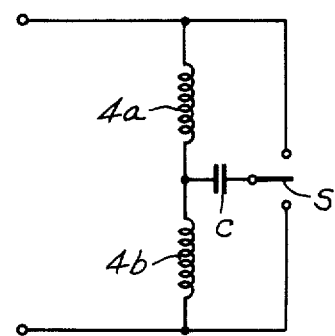

The manner in which the synchronous micromotor of the invention develops the required torque is diagrammatically illustrated in FIG. 7. As is shown at the lower left portion of FIG. 7, the upper section IS includes the upper coil means 4a and the upper permanent magnet means 9a together with the upper half of the stator 8e while the second section IIS includes the lower coil 4b, the lower permanent magnet means 9b and lower half of the stator 8e. In the illustrated example each of the permanent magnet means 9a and 9b has 16 magnetic poles, namely 8N poles respectively alternating with 8S poles, while the stator has 8 axially extending elongated portions 8e. One of these axially extending portions 8e may be considered as occupying the position $T_0$ indicated in FIG. 7 when the motor is not energized. Thus, at this time the elongated portions of the stator are positively located at equal distances from the center of a pole of one of the permanent magnet means and the center of the corresponding opposite pole of the other of the permanent magnet means. Thus, as is shown in FIG. 7 at $T_0$, when the motor is at rest an elongated portion 8e of the stator is situated at the location of the dot-dash line shown at the left portion of FIG. 7 at the equal angular distances $\alpha_1$ and $\alpha_2$ from the center of the left upper S pole and the lower N pole of FIG. 7. It will be noted that the S poles of the upper permanent magnet means of FIG. 7 are situated so as to have the same angular relationship with respect to the corresponding N poles of the lower permanent magnet means of FIG. 7.

Considering now the time $T_1$ shown in FIG. 7, the time interval from energizing to the starting time $T_1$ is on the order of 0 – ½ c/s. This is the time required for the rotor to move back and forth until it reaches an electrically and magnetically optimum position. At the time when the starting conditions are satisified, the IS part of the stator is excited so as to have an N-polarity while the IIS part of the stator is non-excited. As is shown in FIG. 7, the current flowing through the upper coil means 4a is indicated by the solid curve IS while the current flowing through the lower coil means 4b as indicated by the dotted curve IIS, and at the instant $T_1$ the latter current is zero while the current IS has a maximum value providing the IS part of the stator with the N polarity. As a result of this polarity created in each of the elongated portions 8e of the stator, the rotor necessarily moves to a location where the elongated portions of the stator are in line with the S poles of the upper permanent magnet means 9a.

However, at the time $T_2$ the current flowing through the upper coil means is zero while the current flowing through the lower coil means has a maximum value, thus eliminating the excitation of the IS part of the stator and providing the N-polarity at the IIS part of the stator. As a result, the rotor rotates until the elongated portions 8e are brought in line with the S poles of the lower permanent magnet means 9b.

At the time $T_3$ the IS part of the stator is provided with the S polarity as illustrated in FIG. 7 while the stator part IIS loses its polarity, and thus the rotor rotates until each elongated stator portions 8e are brought in line with the next N pole of the upper permanent magnet means 9a.

At the time $T_4$, the current flowing through the upper coil is zero while the current flowing through the lower coil has its maximum value of opposite polarity so that the IS part of the stator now becomes non-excited and the IIS part of the stator gets the S polarity, causing the rotor to turn so as to locate the elongated portions 8e in alignment with the N poles of the lower permanent magnet means 9b.

Then, at the time $T_1'$ the same conditions obtain as were provided at the time $T_1$. The successive elongated portions 8e of the stator are spaced from each other by the same distance as the interval between the times $T_1$ and $T_1'$, so that at these times $T_1$ and $T_1'$ a pair of successive elongated stator portions are respectively in line with the upper S poles as shown in FIG. 7, and in this way the rotor turns in response to the excitation as described above. Thus as a result of the above sequence of operations the motor rotates continuously. As is well known, in order to reverse the direction of rotation of the motor the phase of the coils 4a and 4b can be interchanged.

Figure 6A:
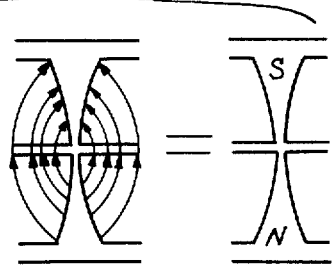
FIGS. 6A and 6B respectively illustrate schematically how the motor operates at different parts of an operating cycle.
Figure 6B:
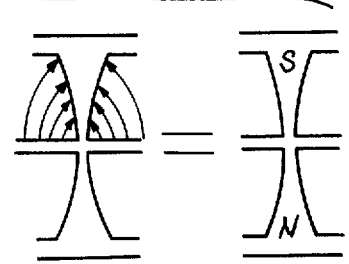

As may be seen from FIG. 7, between the instants $T_2$ and $T_3$ the pair of coils are excited into N and S polarities simultaneously, as is also the case between the instants $T_4$ and $T_1'$. FIG. 6A shows the magnetic flux distribution at these instants when the stator portions IS and IIS are excited in the same direction upon application of the pair of out-of-phase currents. The flux distribution at the instant $T_3$ of FIG. 7 is illustrated in FIG. 6B.

Thus, in accordance with the invention the rotor develops a torque as a result of the reaction of the magnetism as described above with respect to FIGS. 6A, 6B, and 7. Previously known induction micromotors require a rotor which has a considerably large moment of inertia and weight in order to achieve a smooth rotation. However with the micromotor of the present invention the rotor has a moment of inertia and weight which can be minimized so as to be capable of self-starting in response to relatively small magnetic forces present in the motor. With the prior art motors since the rotors must have a moment of inertia of a given magnitude, the weight thereof cannot be reduced to the desired extent. Particularly in a micromotor the moment of inertia and weight of the rotor reduce to a remarkable extent the self-starting capability. Thus it is known that with a micromotor which has a rotor of relatively large weight and moment of inertia the starting power and operation power are influenced to an undesirable degree by these factors so that it is only possible to achieve a low efficiency while generating undesirable heat.

With the present invention the cylindrical stator of circular cross section has the cup-shaped upper portion which is in close contact with the stator casing over a sufficiently wide area and, cooperating especially with the third magnetic pole and narrow portions formed in the elongated portions of the cylindrical stator, establishes an AC magnetic circuit so as to maximize the efficiency. Since the circular cylindrical stator and stator yoke have a minimum magnetic loss, a strong magnetic flux can be developed between the rotor magnets and the elongated portions of the stator thereby developing a torque with a high degree of efficiency.

With conventional motors it is not possible to make effective use of a permanent magnet between the stator portion and the rotor. However with the present invention the N and S poles are easily and simultaneously developed at the circumferential surface of the stator or at the narrow central parts of the elongated stator portions made of a common magnetic material, thus making it possible to have the AC magnetic flux produced by these stator portions return in the integral stator structure and hence effectively intersect the AC magnetic flux produced by the stator magnets with the magnetic flux of DC magnetic field formed by the rotor magnets. In this way the synchronous micromotor of the invention has an extremely large magnetic effect which cannot be achieved by conventional motors.

Moreover it will be seen that in contrast with conventional motors the motor of the present invention does not require any mechanical means to regulate the direction of rotation. Because the coil is in the form of a two-stage coil separated by the annular soft magnetic plate 3 which acts as a third magnetic pole, it is possible to establish a third magnetic circuit efficiently so as to improve the self-starting characteristic and torque of the motor, and supply the coil stages with the AC power having the phase difference referred to above. The annular soft magnetic plate 3 is preferably made so as to have outer and inner diameters almost equal to those of the coils 4a and 4b. This plate 3 is integrally secured together with the coils and the coil supporting structure or bobbin elements 11. The cylindrical stator of circular section is arranged within the coils in such a way that the circumferential surface of the stator is directed toward the inner surfaces of the coils. The opposite ends of the stator are in close contact with the casing parts over an area which is wide enough to establish the AC magnetic circuit.

Although in the above example the number of poles of each of the rotor permanent magnet means is twice the number of elongated portions 8e of the stator, it is possible to provide any arrangement according to which the number of poles of each of the rotor permanent magnet means is an even multiple of the number of elongated portions of the stator. Of course the out-of-phase relationship between the poles of the pair of permanent magnet means corresponds to the out-of-phase relationship between the currents flowing through the pair of coil means 4a and 4b. As was pointed out above, in the rest position each elongated portion of the stator is situated midway between one of the poles of one permanent magnet means and the next-following opposite pole of the other permanent magnet means. Because of the configuration of the opposite ends 8a and 8b of the stator, it is possible to avoid the gaps between the permanent magnets, stator 8 and third magnetic pole 3 and minimize magnetic losses by permitting the AC magnetic field to effectively intersect the DC magnetic field of the permanent magnets.

One of the important features of the invention resides in the use of the soft magnetic plate 3 which greatly contributes to the improvement in the self-starting characteristics and increases the force of rotation. Depending upon the association of a simple solenoid with narrow portions formed on the cylindrical stator, an N or S pole develops locally on the same stator. Strong and weak magnetic flux distributions appear at the circumferential surface of the stator on both sides of the plate 3. These distributions of magnetic flux in conjunction with the electrical currents which flow through the coils 4a and 4b and which have the above phase-difference with respect to each other has a significant effect in imparting a strong rotational directivity on the circular cylindrical stator. When the N and S poles are developed on the opposite sides of the narrowest central part of each elongated stator portion 8e, the soft magnetic plate 3 serving as the third magnetic pole cancels the magnetism so as to prevent the development of any magnetic flux.

In accordance with the phase difference provided by way of the coils 4a and 4b, the rotor magnets are fixedly arranged with respect to each other so that a phase angle develops between the two circular rows of magnetic poles so as to improve in this way the self-starting characteristics and force of rotation as well as imparting the motor of the invention a strong rotational directivity.

What is claimed is:

1. In a synchronous micromotor, an assembly forming an AC magnetic circuit having no gap, said assembly including annular coil means coaxially surrounding a predetermined axis, a casing of soft magnetic material having a transverse wall extending perpendicularly across said axis and a cylindrical wall extending from a peripheral edge of said transverse wall and surrounding said coil means, and an inner cylindrical stator component of soft magnetic material also coaxially surrounding said axis and situated within and surrounded by said coil means while being located closely adjacent thereto, said cylindrical component being connected at one end to an inner transverse wall of soft magnetic material extending along and engaging said transverse wall of said casing and at an opposite end to an outwardly directed flange projecting outwardly from said cylindrical stator component and having an outer peripheral edge fixed to an inner surface of said cylindrical wall of said casing with said coil means being situated between said flange and said transverse wall of said casing, said flange also being made of a soft magnetic material, so that said coil means, casing, cylindrical stator component, transverse wall fixed to said one end thereof and flange fixed to said other end thereof cooperate to form said AC magnetic circuit assembly which has no gap, and a rotor including an annular permanent magnet means coaxially surrounding said axis and situated coaxially within said cylindrical stator component while defining a small gap therewith, and support means connected with said permanent magnet means to support the latter for rotation about said axis, said cylindrical stator component being formed with a series of axially extending cutouts circumferentially distributed uniformly about said axis and being of a substantially elliptical configuration except for opposed ends of said cutouts, so that the latter define between themselves axially extending wall portions of said cylindrical stator component which are substantially of an hourglass configuration and have central regions where their circumferential width is smaller than at any other regions thereof.

2. The combination of claim 1 and wherein said rotary permanent magnet means includes two series of circumferentially alternating north and south poles with said two series being situated on opposite sides of a plane normal to said axis and passing through said narrow central regions of said axial wall portions of hourglass configuration of said cylindrical stator component.

3. The combination of claim 2 and wherein the north poles of one of said series of said permanent magnet means are circumferentially aligned with the south poles of the other series.

4. The combination of claim 1 and wherein said coil means includes a pair of annular coils and a disc of soft magnetic material situated therebetween in a plane normal to said axis, said disc surrounding the latter axis and forming a third magnetic pole between said coils, said disc between said coils being situated in a plane normal to said axis and passing through the narrow central regions of said axial wall portions of said stator component, and said permanent magnet means including a pair of series of circumferentially arranged north and south poles respectively situated on opposite sides of and adjacent to said plane with the poles of one series being angularly offset with respect to the poles of the other series by an angle equal to the phase difference between AC currents supplied respectively to said coils.

5. The combination of claim 4 and wherein a disc of soft magnetic material is also situated in said plane between the two series of poles of said permanent magnet means.

6. The combination of claim 4 and wherein said disc between said coils has an inner periphery engaging said cylindrical stator equipment at the narrow central regions of said axially extending wall portions thereof.

7. The combination of claim 4 and wherein said coils are connected in parallel.

8. The combination of claim 4 and wherein said coils are connected in series.

9. The combination of claim 1 and wherein said cylindrical stator component is integral with said transverse wall connected to said one end thereof.

10. The combination of claim 9 and wherein said cylindrical stator component is also integral with said flange projecting outwardly from the opposite end thereof.

11. The combination of claim 1 and wherein said support means includes a rotor shaft whose axis coincides with said predetermined axis and a body of nonmagnetic material fixed to said rotor shaft and having a cylindrical portion coaxially surrounding said rotor shaft and fixedly carrying at its outer surface said permanent magnet means.

12. The combination of claim 11 and wherein s a bearing means for said rotor shaft is made of a nonmagnetic material and is fixed to said cylindrical stator component at the interior thereof, extending across an opening at the end of said cylindrical component where said flange is situated.

* * * * *